March 3, 1959 U. F. GIANOLA ET AL 2,876,419
MAGNETOSTRICTION DEVICES
Filed Dec. 1, 1954 5 Sheets-Sheet 1

INVENTORS: U. F. GIANOLA
R. L. WALLACE, JR.
BY Harry C. Hart
ATTORNEY

March 3, 1959     U. F. GIANOLA ET AL     2,876,419
MAGNETOSTRICTION DEVICES

Filed Dec. 1, 1954     5 Sheets-Sheet 2

INVENTORS: U. F. GIANOLA
R. L. WALLACE, JR.

BY Harry C. Hart
ATTORNEY

March 3, 1959 U. F. GIANOLA ET AL 2,876,419
MAGNETOSTRICTION DEVICES
Filed Dec. 1, 1954 5 Sheets-Sheet 3

INVENTORS: U. F. GIANOLA
R. L. WALLACE, JR.
BY Harry C. Hart
ATTORNEY

March 3, 1959  U. F. GIANOLA ET AL  2,876,419
MAGNETOSTRICTION DEVICES
Filed Dec. 1, 1954  5 Sheets-Sheet 4
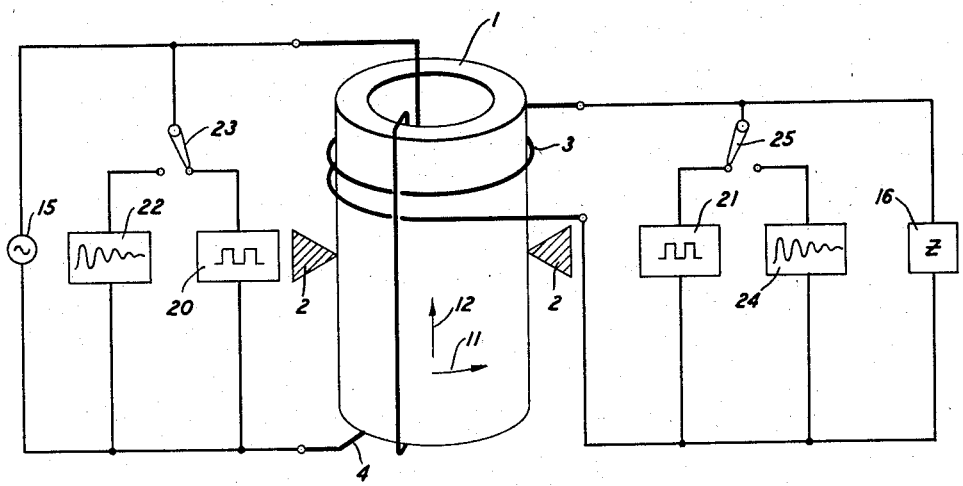
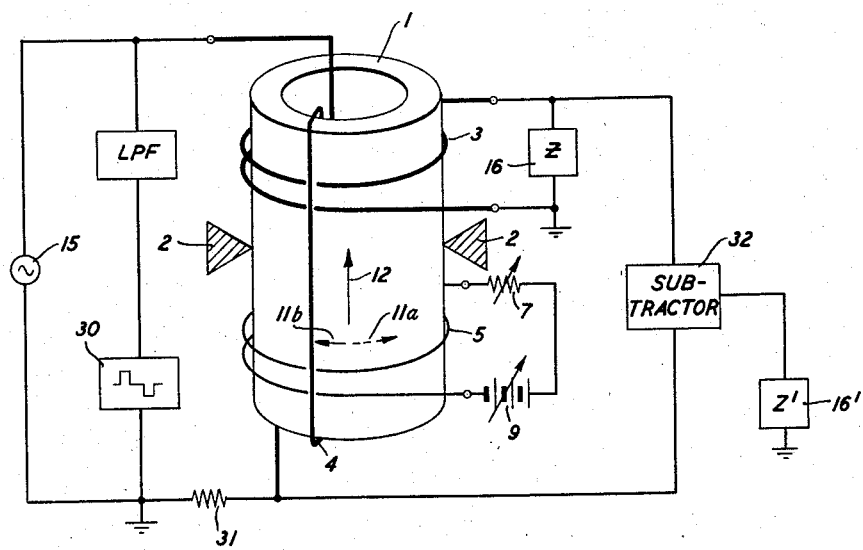
INVENTORS: U. F. GIANOLA
R. L. WALLACE, JR.
BY Harry C. Hart
ATTORNEY

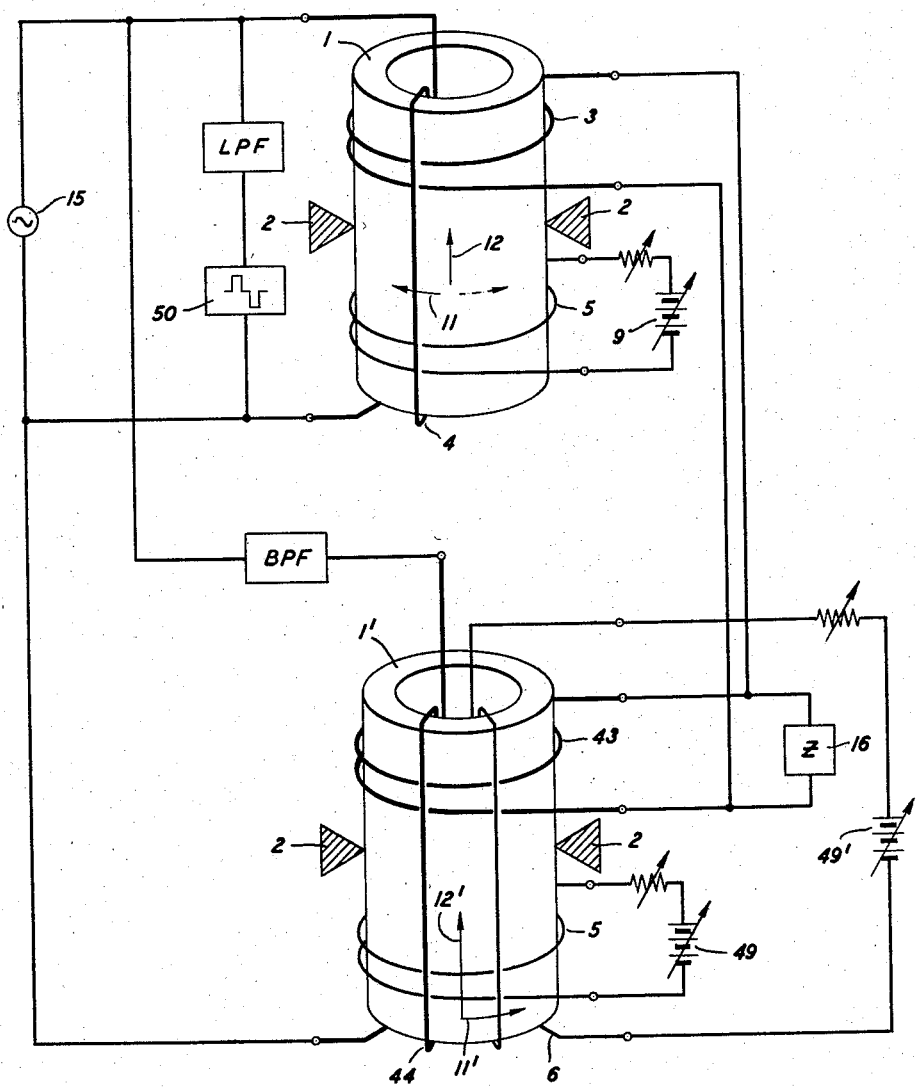

United States Patent Office 2,876,419
Patented Mar. 3, 1959

2,876,419

MAGNETOSTRICTION DEVICES

Umberto F. Gianola, Morristown, and Robert L. Wallace, Jr., Plainfield, N. J., assignors to Bell Telephone Laboratories, Incorporated, New York, N. Y., a corporation of New York Application December 1, 1954, Serial No. 472,310

18 Claims. (Cl. 332—9)

This invention relates to magnetostrictive devices and has for its principal object the provision of a novel electric circuit component in which coupling between an input circuit and an output circuit is provided solely by magnetostrictive action. The novel unit of the invention has many uses and accordingly, subsidiary objects are to provide a novel filter, a novel modulator, a novel gate circuit and a novel memory device.

The electromechanical resonance properties of certain ferromagnetic substances have long been known. They have been turned to account in the construction of resonators of various types as described, for example by G. W. Pierce in his Patent 1,997,599 and by W. Van B. Roberts in an article published in the Radio Corporation of America Review for March 1953, volume 14, page 3. Many such devices include only two accessible terminals and are therefore in the nature of impedance elements rather than coupling circuits. In some cases, notably in the Pierce patent, referred to above, there are four accessible terminals and a magnetostrictive element is included to provide coupling between an input circuit and an output circuit. However, in such devices the input circuit and the output circuit are inductively related so that the magnetostrictive coupling is always accompanied by, and may in principle be masked by, inductive coupling.

It has long been known that two electromagnetic windings may be completely decoupled from each other by disposing them in mutually orthogonal relation. Such windings are sometimes termed "crossed coils." The crossed coil principle may be employed whether the principal magnetic flux path be in air or be in a ferromagnetic material, usually employed for the sake of its high permeability. The core may have a form such as to cause a wide departure of the configuration of the magnetic lines of force from their configuration in air. This principle of crossed coils renders it possible to dispose two windings exceedingly close together without danger of inductive coupling between them.

It has heretofore been impossible to achieve the advantages of the crossed coil principle and at the same time to provide a desired and controlled amount of coupling between two coils by way of magnetostrictive action.

The present invention is based upon the discovery that, with two crossed coils wound on a magnetostrictive body as a core, when a magnetic bias of proper magnitude and direction is applied to the core, coupling is achieved between the coils by way of magnetostrictive action without any inductive action whatever. With a core of suitable properties the amount of the resulting coupling may be considerable and it may be varied in magnitude over a wide range. In particular, it may be reduced to zero, thus completely decoupling the coils once more. It may equally well be reversed in sign and varied through a corresponding range, thus reversing the phase of the voltage derived from the output circuit.

Magnetostrictive action involves stresses within the ferromagnetic body followed by corresponding strains. The body should therefore be mounted in a fashion such that it is free to vibrate. In operation, vibration may take place at a frequency or frequencies determined by the mechanical properties of the core and its geometrical form and dimensions. In accordance with well-known principles the resonant frequencies may be predetermined by control of the size, shape and condition of the core, and the sharpness of resonance may be controlled, within limits, by adjustment of the properties of the material of which it is constructed, or by means of external damping. Such resonant properties render the novel circuit element useful as a filter.

This periodic resonant vibration may be varied through a wide range of amplitudes under control of an additional flux-producing signal. The device may thus be employed as a modulator; or if the signal strength be such as to drive it regularly between the condition of full coupling between windings and the zero coupling condition, the device may serve as a gate circuit or a crosspoint switch.

By control of the fabrication process of the core in well-known fashion it is possible to endow it with a high degree of remanence, in which case the output signal endures after the termination of modulating input signal, in which case the novel component becomes a memory device.

Materials which are recommended for the magnetostrictive core to be employed in practicing the invention are the ferrites. These materials are described in detail in the literature, for example in a publication entitled "Ferrites and their properties at radio frequencies," by Robert L. Harvey, published in the Proceedings of the National Electronic Conference for February 1954, volume 9, page 287, and in a book entitled "New Developments in Ferromagnetic Materials," by J. L. Snoek (Elsevier Publishing Company, 1949). Among the many materials having the various properties described in these publications one which appears to serve adequately for the purpose of the invention is a so-called nickel ferrite having the formula $NiO.Fe_2O_3$, containing a proportion of nickel to iron in the ratio of two to one atomic weights. This material has a sufficient amount of remanence for some of the present purposes and not too much for the others. It has a sizable and readily variable coefficient of magnetostrictive coupling.

The invention will be fully comprehended from the following detailed description of preferred illustrative embodiments thereof taken in connection with the appended drawings in which:

Fig. 8 is a schematic circuit diagram illustrating the application of the invention to a coincidence gate;

Fig. 9 is a schematic circuit diagram showing a memory device employing the invention; and Fig. 10 is a schematic circuit diagram illustrating an alternative to the apparatus of Fig. 9.

Figure 1:
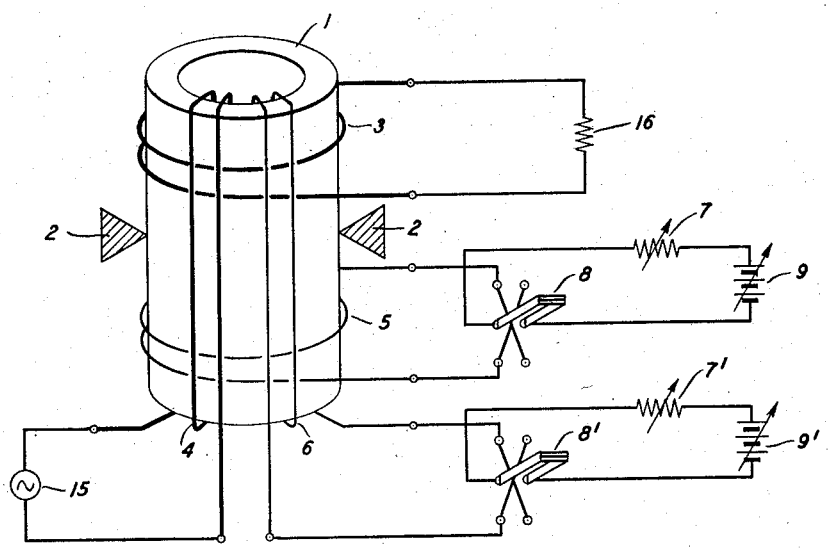
Fig. 1 is a schematic circuit diagram showing a novel magnetostrictive circuit component in accordance with the invention.

Referring now to the drawings, Fig. 1 shows a core 1 of ferromagnetic magnetostrictive material, e. g., of ferrite material, having the form of a hollow cylinder or elongated torus. It may be supported as by pins 2 which engage its periphery in a central plane in a fashion to permit the core to vibrate freely in torsion. It is provided with two windings which may be denoted, respectively, a solenoid winding 3 and a toroid winding 4. The first of these windings is wrapped around the cylinder as such while each turn of the second winding passes through the central hole. From the inductive standpoint, therefore, these two windings are crossed coils and thus are completely decoupled from each other.

For operation in accordance with the invention the core 1 requires a magnetic bias which extends in a direction intermediate between that of a flux due to a current in the first coil 3 and that of a flux due to a current in the second coil 4. In the core as a whole, therefore, the magnetic bias extends helically or spirally about the axis of the core. While such magnetic bias may be applied in any desired fashion, a convenient one is to provide the core with two supplementary bias windings, one of which 5 is solenoidal and the other 6 is toroidal. Each of these supplementary bias windings may be energized, through a variable resistor 7, 7' and a reversing switch 8, 8' from a source of steady current such as a battery 9, 9'. It is apparent that operation of either one of the reversing switches 8, 8' may be at a rate as rapid as convenient. Whence, either or both of the batteries 9, 9', together with either or both of the associated reversing switches, may be viewed as a source, or sources, of pulse signals effectively connected in circuit with an associated principal solenoidal or toroidal winding.

Figure 1A:
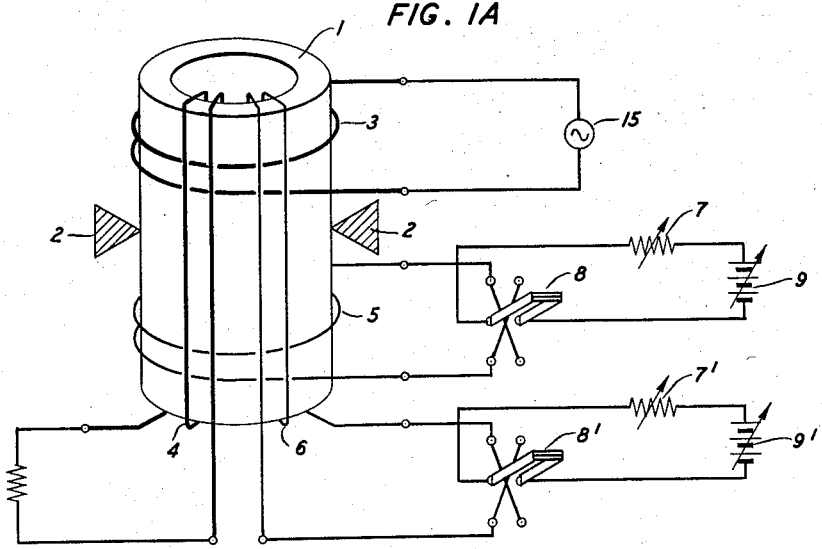
Fig. 1A is an alternative to Fig. 1.
Figure 2:
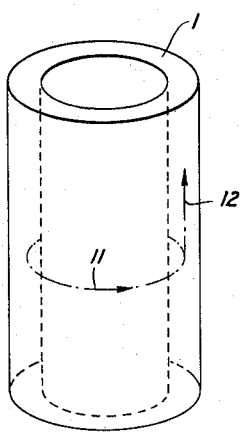
Figs. 2 to 5 are diagrams illustrating the composition of magnetic vector biases in the core of Fig. 1 and the action of mechanical strains thereon.

A signal source 15 is connected to the terminals of one of the windings 4 and a load 16 is connected to the terminals of the other winding 3. For the sake of illustration the source 15 is shown connected to the toroidal winding 4 and the load 16 to the solenoidal winding 3. These, however, are fully interchangeable, as shown in Fig. 1A.

Figure 3:
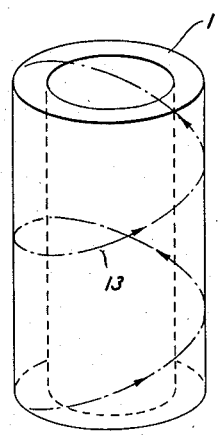

As a preliminary to the discussion of the operation of the apparatus of Fig. 1, reference may be made to Figs. 2 to 5 which show the hollow cylindrical core 1 in outline and arrows to represent the magnetization components either due to the bias currents in the supplementary windings or otherwise provided. Thus in Fig. 2 a circular arrow 11 shown in a horizontal plane represents the direction of that component of the magnetization of the cylinder which is due to a current flowing in the supplementary toroidal winding 6. Similarly, a vertical arrow 12 represents the component of magnetization due to a current flowing in the supplementary solenoidal winding 5. Fig. 3 shows the composition of these component vectors 11, 12 to produce a resultant vector 13 having a helical form. It is to be noted that at every point of the cylindrical core 1 the helical vector 13 lies at an angle both to the central axis of the cylinder and to a plane normal to that axis. Thus its direction is intermediate between that of a flux produced by a toroidal winding 6 and that of a flux produced by a solenoidal winding 5.

Figure 4:
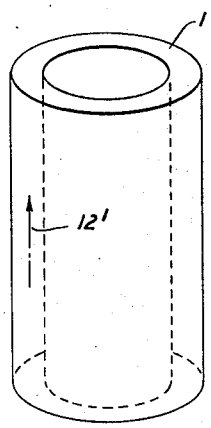
Figure 5:
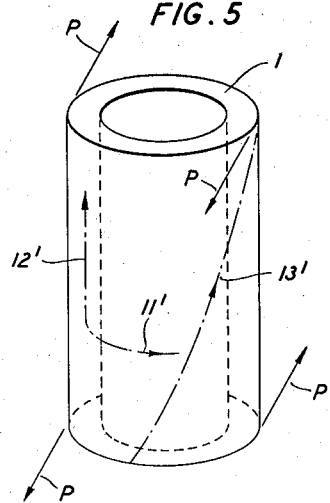

Fig. 4 shows the core 1 with an axial component of magnetization 12' only. If a twisting torque be applied to this core as indicated in Fig. 5 by the externally applied forces P, then, as a consequence of magnetostrictive action, a circular component of magnetization 11' is generated in the core 1. The resultant of this circular component and the original axial component is a helical vector 13' as likewise indicated in Fig. 5. It will readily be apparent that, if the core of Fig. 4 be provided with a toroidal winding which is, of course, initially not linked by the axial flux 12', and if the core then be twisted as indicated in Fig. 5, the resulting circular component of magnetization 11', generated as above described, is in a direction to link the toroidal winding and hence to cause an electromotive force to be generated therein.

Similarly, though not illustrated, if a core be initially biased with a circular component of magnetization only, and provided with a solenoidal winding, the initial magnetization component does not link the winding and hence generates no electromotive force therein. But if the core be now twisted, an axial component of magnetization is generated in the core which links the solenoidal winding, whereupon an electromotive force is generated in the solenoidal winding.

The foregoing explanatory discussion postulates the application of mechanical forces to provide a twisting torque. However, by proper disposition of a bias magnetization component and an input winding the required twisting torque may be furnished by electromagnetic means. Thus, if the cylinder be provided with an initial magnetic bias in the axial direction as in Fig. 4 and if, as in Fig. 1, an input signal current derived, for example, from a source 15 be passed through its toroidal winding 4 to generate a momentary additional circular component of magnetization, every element of the cylinder is subjected to a magneto-strictive stress in the direction of the resultant of these two magnetization components, i. e., in a direction which is helical with respect to the cylinder as a whole. As a consequence, if the material yields at all to these stresses it undergoes a twisting strain about its major axis. The same result holds if the direction of the initial bias magnetization and its incremental signal magnetization be interchanged, i. e., if the initial magnetization be circular and the incremental magnetization be axial as provided by the flow of input current in a solenoidal winding as in Fig. 1A.

From the foregoing explanatory considerations it will now be apparent that if the cylinder be given an initial magnetic bias in the helical direction, a signal applied to the input winding, whether this be the solenoidal winding or the toroidal winding, momentarily increases or diminishes one or the other of the two components of this magnetic bias and so applies a twisting stress to the cylinder. By reason of its being mounted in a fashion such that it is free to yield to this stress, the cylinder undergoes a twist. This twist in turn modifies the other component of the initial magnetization bias, and the incremental flux which ensues links the other of the two coils, toroidal or solenoidal as the case may be. Thus a signal applied to the input terminals is translated to the output terminals, wholly by way of magnetostrictive action and despite the fact that the output coil is completely decoupled from the input coil from the standpoint of ordinary magnetic induction.

The mechanical properties of the core, namely, the elasticity and density of its material, taken together with its geometrical properties make for a certain moment of inertia and a certain stiffness, which in turn determine a certain resonant frequency. At this resonant frequency the twisting behavior is accentuated; and hence, at this frequency, for an input signal of a given magnitude, the output signal is a maximum. Thus a frequency-selective device has been provided which, by virtue of the crossed coil principle, is both exceedingly compact and entirely free of stray inductive couplings between the input winding and the output winding.

Figure 6:
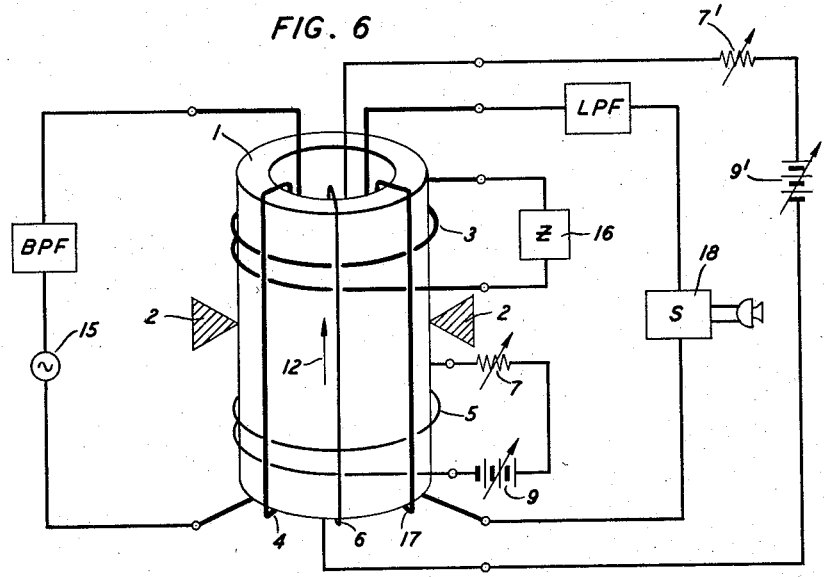
Fig. 6 is a schematic circuit diagram illustrating a modulator embodying the invention.

Fig. 6 shows an arrangement by which the invention is turned to account in the construction of a modulator. Here the bias windings 5, 6 together with the bias current sources 9 and 9' and the resistors 7 which control the magnitudes of the axial and circular bias components, respectively, are as shown in Fig. 1. The signal source 15, connected to the toroidal winding 4, may generate a current of a suitable high frequency which may serve as a carrier. Its frequency is preferably equal to the resonant frequency of the core 1. By virtue of the magnetostrictive action described above the energy of this source 15 is translated into an output winding 3, orthogonally disposed with respect to the input winding 4, and so into a load 16. The amount of translation depends on the magnitudes of the two component magnetic biases in the core. It has its maximum value when the bias vector magnetization follows a helical path which lies everywhere at 45° from a plane normal to the axis; in other words, when the axial and circular components are of equal magnitude. Changing the magnitude of either of these two components while leaving the other unchanged affects the magnetostrictive coupling factor and so modifies the amount of energy translated from the carrier source 15 into the load 16. The circular component may be thus affected by the addition of a supplementary toroidal winding 17 energized by a modulating current source 18. This modulating input modifies the amount of twisting strain which the core 1 undergoes per unit of input carrier signal, and also modifies the amount of energy delivered to the output coil per unit of twisting strain of the core. As a result the total energy induced in the output coil 3 per unit of input carrier signal is modified in relation to the magnitude of the modulating signal; which thus determines the envelope of the output carrier.

Figure 7:
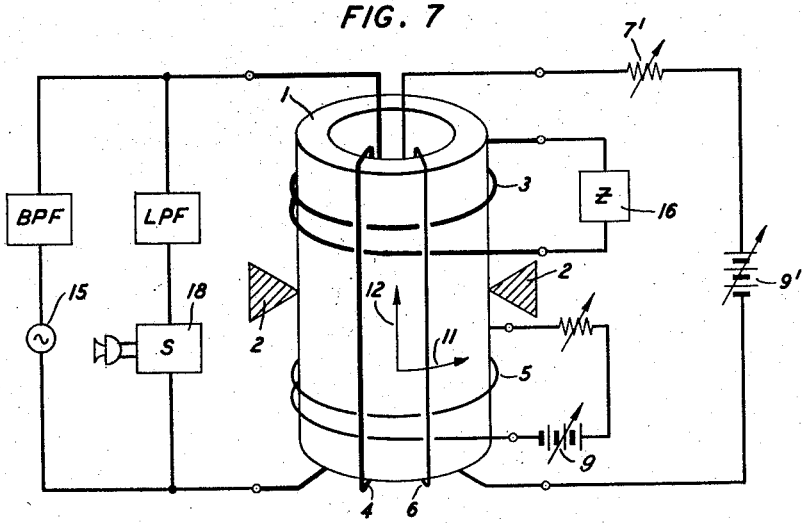
Fig. 7 is a schematic circuit diagram illustrating an alternative to the modulator of Fig. 6.

If preferred, a single toroidal winding may carry both the carrier current and the modulating signal current. Fig. 7 shows such an arrangement in which both sources 15, 18 are connected in parallel to a single toroidal winding 4 the other toroidal winding 17 of Fig. 6 being dispensed with. Many other variants of the modulator of Fig. 6 are possible.

As explained above, four typical conditions of magnetization may exist within the material of the core, namely:

(1) No magnetic bias at all;
(2) An axial bias component only;
(3) A circular bias component only; and
(4) Both an axial component and a circular component, the resultant of which may be represented by a helical vector.

As also explained above, when the output winding is orthogonal to the input winding such windings remain decoupled under the first, second and third of these situations, being coupled magnetostrictively only in the fourth situation.

Any circuit component having these properties lends itself to use as a coincidence gate. Fig. 8 shows the adaptation of the invention to this purpose. Here, a toroidal input winding threads the central hole of the core 1 while an output winding 3 is wrapped solenoidally around the circumference of the core. As in Fig. 7, a carrier frequency source 15 is connected to the input winding and a load 16 is connected to the output winding.

As distinguished from Fig. 7, however, the magnetization condition of the material of the core is provided, not by a steady biasing current source, but on an intermittent basis. To this end, a first source 20 of pulses is connected to the toroidal input winding 4 and when it generates a pulse in this winding a circular magnetization condition, represented by the horizontal arrow 11, exists in the core. A second source 21 of pulses is connected to the solenoidal output winding 3 and when it generates a pulse there exists an axial component of magnetization within the core represented by the vertical arrow 12.

Under either of these conditions alone, or neither of them, the load 16 remains decoupled from the carrier source 15. When, however, both conditions occur together, e. g., when the axial component of magnetization 12 and the circular component of magnetization 11 are co-existent so that the resultant magnetization condition within the core 1 is helical, then the load 16 is immediately coupled to the carrier source 15 through magnetostrictive action in the fashion described above.

Such co-existence of the two components 11, 12 may be secured by the simultaneous application of pulses from both pulse sources 20, 21 to their respective windings 4, 3. If the remanent properties of the core material are not significant the coupling condition may be best achieved in this way. If, however, remanence be among the more significant properties of the core material then each magnetization component endures after the removal of the pulse which produces it. Hence, magnetostrictive coupling between the load 16 and the carrier source 15 comes into being upon the application of the second of two such pulses and endures until one or the other of the two magnetization components is nullified. Thus the property of remanence endows the coincidence gate of Fig. 8 with memory.

Communication technology presents many instances in which a coincidence gate endowed with memory is a useful apparatus component. To take but a single example, a cross-point switch may be considered which operates to establish a voice current path between a selected one of a number of incoming telephone lines and a selected one of a number of outgoing trunks. Such apparatus is commonly represented by a rectangular array wherein vertical conductors may represent incoming lines, horizontal conductors may represent outgoing trunks, and a memory gate of appropriate type is associated with each cross point. The apparatus of the invention may be employed as such a cross-point switch. In this event the application of a brief pulse identifying a single incoming line establishes one magnetization component in all the cores associated with that line, and similarly, application of another brief pulse indicating a selected trunk establishes the other magnetization component in all the cores associated with that trunk. The one core which lies at the cross point between the particular incoming line and the particular outgoing trunk thus receives both components of magnetization. Hence, the selected trunk is coupled magnetostrictively by way of this core to the selected incoming line, all other lines and trunks remaining decoupled from one another.

If the remanent property of the core be thus turned to account it is, of course, necessary to provide means for nullifying the magnetization condition and so to place the core in readiness for a new operation. To this end, an auxiliary source 22 of a damped sine wave is shown associated with the input winding 4, to be connected thereto by a switch 23. This operates to erase the circular magnetization component 11. A similar damped sine wave source 24 and a similar switch 25 connected to the solenoidal winding 3 operate to erase the axial magnetization component 12.

If the continuation of the output after removal of an input pulse is desired without the dual input feature of Fig. 8, a core material may again be employed in which remanence is the dominant property and windings may be applied to it in the fashion shown in Fig. 9 to produce a memory device. A carrier source 15 is connected to an input toroidal winding 4 while a load 16 is connected to an output solenoidal winding 3. An axial component of bias magnetization may be applied through an auxiliary solenoidal winding 5, connected to battery 9. The presence of this axial magnetization component leaves the load 16 decoupled from the source 15. Here, however, a source 30 of pulses of alternately opposite polarities is connected to the input winding 4 along with the carrier source 15. For one pulse polarity it produces a circular magnetization component 11a in one direction and for the other pulse polarity it produces a circular magnetization component 11b in the other direction. The resultant magnetization vector is helical in the core, having in the one case a positive slope and in the other case a negative slope. Inasmuch as the coupling between the load 16 and the source 15 depends on the direction of the circular magnetization component or, in other words, on the slope of the helical vector, a reversal of the sign of the pulse of the input source 30 effects a reversal in the phase of the carrier signal as it is translated into the load 16. This output voltage may be combined in additive relation with the input signal by way of an impedance element such as a resistor 31 and a subtractor 32 connected in the fashion shown. Provided the magnitude of the impedance element 31 be appropriately adjusted in a fashion which will now be evident, the output of the subtractor 32, which appears across a second load 16', under one of the foregoing conditions has the value of zero while under the other condition its magnitude is twice that of the load voltage. Provided the remanence of the core 1 be sufficient, this output condition endures in each case after the removal of the input pulse and until the application of a new input pulse of opposite polarity.

Thus, by employment of the apparatus of Fig. 9, it is in principle possible to decide by observation of the subtractor output wether the circular magnetization component of the core extends in the clockwise direction or in the counterclockwise direction. Such apparatus constitutes a memory device in the sense that an event of a first kind represented by a postive pulse from the source may establish a circular magnetization component in the clockwise direction while an event of the second kind, represented by a negative pulse of the source, may establish the circular bias component in the counterclockwise direction. Reference to the output of the subtractor then supplies a positive indication as to which one of these two events was the last to occur.

Under some conditions it is advantageous to employ two or more of the units of the invention together. Fig. 10 shows such an arrangement. Here a carrier source 15 is applied to a toroidal winding of each core 1, 1', e. g., by connection of such windings 4, 44 in parallel; while the output coils 3, 43, wound solenoidally on the core 1, are similarly connected in parallel. A modulating source 50, e. g., a source of pulses of polarity appropriate to an event is connected to the toroidal winding 4 of one only of the two cores 1, 1'. As indicated by the arrows, the modulating source 50 operates in the fashion described above to shift the circular bias magnetization component 11 from a counterclockwise orientation to a clockwise one. The upper core 1 is provided with a solenoidal bias winding 5, which gives rise to an axial bias component 12. The lower core 1' is provided with two bias windings 5, 6, which give rise to an axial component 12' and a circular component 11', respectively. The bias components of the lower core 1' are unaffected by the pulse source 50. Hence, under one condtion the currents in the solenoidal output windings 3, 43, of the two cores are in phase coincidence while for the other pulse condition they are in phase opposition. Under the first condition they are additive in the load 16 to give a high energy output, while under the opposite condition they cancel each other in the load to give a zero output.

The invention has been described in connection with magnetic bias components which extend in the axial direction and in the circular direction, respectively, within the material of the toroidal core. These components, however, are not exclusive. It will readily be apparent, especially with a core of other form, that a radial and an axial bias component or a circular and a radial bias component of magnetization may be employed instead. The selection of the bias components to be employed is determined in some measure by the selection of the core form. The toroidal form illustrated and described above offers the advantage that at least one of the bias components, namely, the circular one, may be continuous in the material of the core. With a continuous flux path in ferromagnetic material substantial magnetization may be achieved with a small magnetomotive force. Furthermore, this offers the advantage that no free poles appear at any part of the material. Other core forms may be conceived in which the flux path is unbroken and continuous for both components of magnetization.

Various combinations of the magnetostrictive coupling units of the invention and various other uses of such units and of such combinations will suggest themselves to those skilled in the art.

What is claimed is:

1. A circuit element which comprises a body of elastic ferromagnetic material, means for establishing, within the material of said body, a first bias component of magnetization which extends uniformly within and substantially throughout the whole of said body parallel with a first coordinate and a second bias component of magnetization which extends uniformly within and substantially throughout the whole of said body parallel with a second coordinate that is normal to said first coordinate, whereby the resultant of said components extends uniformly within and substantially throughout the whole of said body in a direction intermediate between said first and second coordinates, a first winding linking said body in a plane parallel with said first component, a second winding linking said body in a plane parallel with said second component, said windings being thus disposed in orthogonal magnetizing relation, one of said windings serving as an input winding, the other of said windings serving as an output winding, a signal source connected to said input winding, the flux due to the signal of said source cooperating magnetostrictively with said established magnetization components to generate an electromotive force in said output winding, and means for utilizing energy of said electromotive force.

2. A circuit element which comprises a body of elastic ferromagnetic material, a support for said body disposed in the plane of a vibration node of said body, said body being otherwise unsupported, two windings linking said body in orthogonal magnetizing relation, and means for establishing within and throughout the whole of said body a substantially uniform magnetic bias condition which is in a direction to thread both of said windings.

3. In combination with apparatus as defined in claim 2, means for varying said magnetic bias condition.

4. Apparatus as defined in claim 3 wherein said varying means comprises means for varying the magnitude of one component of said magnetic bias condition.

5. Apparatus as defined in claim 3 wherein said varying means comprises means for reversing the direction of one component of said magnetic bias condition.

6. Apparatus as defined in claim 3 wherein said varying means comprises means for varying two orthogonal components of said magnetic bias condition.

7. A circuit element which comprises a body of elastic ferromagnetic material, a support for said body disposed in the plane of a vibration node of said body, said body being otherwise unsupported, two windings linking said body in orthogonal magnetizing relation, means for establishing within said body a magnetization condition which is in a direction to thread both of said windings, and means for varying said magnetization condition comprising means for varying two orthogonal components of said magnetization condition.

8. A circuit element which comprises a body of elastic ferromagnetic material, a support for said body disposed in the plane of a vibration node of said body, said body being otherwise unsupported, two windings linking said body in orthogonal magnetizing relation, means for establishing within and substantially throughout the whole of said body a substantially uniform magnetic bias condition which is in a direction to link both of said windings, and signal-controlled means for varying said magnetic bias condition, thereby to alter the degree of coupling between said two windings.

9. A circuit element which comprises a body of elastic ferromagnetic material, a first winding linking said body substantially uniformly throughout its extent, a second winding linking said body substantially uniformly throughout its extent in a magnetizing relation orthogonal to said first winding, said windings being thus inductively decoupled from each other, a signal source and a first pulse source effectively connected to said first winding, and a load and a second pulse source effectively connected to said second winding, whereby said load is magnetostrictively coupled to said source only upon the application of pulses of both of said pulse sources.

10. Apparatus which comprises a body of elastic ferromagnetic material, an input winding linking said body substantially uniformly throughout its extent, an output winding linking said body substantially uniformly throughout its extent in a magnetizing relation orthogonal to said input winding, a source of carrier frequency current connected to said input winding, a load connected to said output winding, means for establishing within said body a steady bias magnetization condition in a direction parallel to the plane of said input winding whereby it threads only said output winding, a source of pulses of alternately opposite polarities, and means controlled by said pulse source for establishing within said body an alternating component of magnetization in a direction normal to said steady bias direction, whereby signals of said carrier source are translated into said load with a phase dependent upon the polarity of a pulse of said source.

11. In combination with apparatus as defined in claim 10, means for subtractively combining the signal of said source with the signal appearing in said load.

12. Apparatus which comprises a pair of bodies of elastic ferromagnetic material, each of said bodies being linked substantially uniformly throughout its extent by a first winding and by a second winding disposed in a magnetizing relation orthogonal to said first winding, said two first windings being connected in parallel and to a source of carrier current, said two second windings being connected in parallel and to a load, means for establishing within one of said bodies a steady bias magnetization condition having two components which are directed to thread the two windings of said last-named body, respectively, means for establishing within the other of said bodies a steady bias magnetization condition which is directed to thread only one of the windings of said other body, a source of pulses of alternately opposite polarities, and means controlled by said pulse source for establishing within said last-named body an alternating magnetization condition in a direction to thread only the other of the two windings of said other body, whereby the energy of said carrier source is translated into said load by virtue of magnetostrictive action in said bodies and in additive relation for one polarity of the pulses of said pulse source and in subtractive relation for the other polarity of the pulses of said pulse source.

13. Apparatus a set forth in claim 1 wherein said first named magnetization establishing means comprises a biasing winding linking said body in a plane perpendicular to said first named coordinate, a source of current, and switching means for reversibly connecting said current source to said biasing winding.

14. Apparatus as set forth in claim 1 wherein said signal source comprises a first source of energy of a first frequency content and a second source of energy of a different frequency content, whereby energy of said first source combines with energy of said second source to form modulation products in said utilizing means.

15. Apparatus as set forth in claim 1 wherein said means for establishing said first and second components of magnetization comprises a first pulse source connected to said input winding and a second pulse source connected to said output winding.

16. Apparatus as set forth in claim 1 wherein said means for establishing a first component of magnetization comprises a source of pulses of opposite polarities connected to said input winding and, in combination therewith, means for subtractively combining the signal of said first named signal source with the signal appearing in said utilizing means.

17. Apparatus as set forth in claim 1 and, in combination therewith, a second body of elastic ferromagnetic material, means for establishing within said second body a first component of magnetization which extends parallel with a first coordinate axis, means for establishing within said second body a reversible second component of magnetization extending parallel with a second orthogonal axis, whereby the resultant of said components extends reversibly in a direction intermediate between said first and second axes, a second input winding linking said second body in a magnetizing relation parallel to said second axis, and a second output winding linking said second body in a magnetizing relation parallel to said first axis, said input windings being connected in parallel to said source and said output windings being connected in parallel to said load, whereby signals due to said source cooperate with said magnetization components to combine output signals in said load, the alegbraic sign of said combining being determined by the polarity of said reversible magnetization component.

18. A circuit element which comprises a first means for establishing a magnetic flux field, a second means for establishing a magnetic flux field orthogonal to said first flux field, an elastic ferromagnetic body disposed in a uniformly magnetizable relation with said first and second field establishing means, whereby magnetic flux field components are directed throughout the whole of said body by said first and second means along a first coordinate and along a second orthogonal coordinate respectively, said body comprising a substantially closed magnetic path along one of said coordinates, a first winding linking said body in a plane parallel with said first component, a second winding linking said body in a plane parallel with said second component, said windings being thus disposed in orthogonal magnetizing relation, one of said windings serving as an input winding, the other of said windings serving as an output winding, a signal source connected to said input winding, the flux due to the signal of said source cooperating magnetostrictively with said established magnetization components to generate an electromotive force in said output winding, and means for utilizing energy of said electromotive force.

References Cited in the file of this patent
UNITED STATES PATENTS

| | | |
|---|---|---|
| 1,438,987 | Espenschied et al. | Dec. 19, 1922 |
| 1,882,397 | Pierce | Oct. 11, 1932 |
| 2,692,344 | Van Der Burgt et al. | Oct. 19, 1954 |
| 2,696,590 | Roberts | Dec. 7, 1954 |
| 2,708,237 | Roberts | May 10, 1955 |
| 2,736,824 | Roberts | Feb. 28, 1956 |
| 2,738,467 | Roberts | Mar. 13, 1956 |